United States Patent Office 3,344,125
Patented Sept. 26, 1967

3,344,125
PROCESS FOR CROSSLINKING A SATURATED SYNTHETIC RUBBER USING A SULFUR LIBERATING MATERIAL AND AN ORGANIC PEROXIDE
Hans G. Gerritsen, Deventer, Netherlands, assignor to Koninklijke Industrieele Maatschappij Noury & Van der Lande N.V., Deventer, Netherlands, a corporation of the Netherlands
No Drawing. Filed Apr. 12, 1965, Ser. No. 447,559
Claims priority, application Netherlands, Apr. 21, 1964, 64—4,319
8 Claims. (Cl. 260—79.5)

This invention relates to a process of preparing a cross-linkable composition consisting essentially of an elastomer and a peroxidic compound, to the composition per se and to a process for cross-linking the composition according to the present invention.

It is known that virtually saturated synthetic rubbers such as copolymers of ethylene and $CH_2=CH$-groups containing monomers, silicone-rubber, polyurethane rubber may be cross-linked by mixing the rubber with a peroxidic compound in a quantity sufficient for cross-linking, optionally in the presence of sulphur or sulphur releasing compounds and then heating the mixture obtained. Auxiliary agents such as zinc- and magnesiumoxide improving the aging properties of the finished product, co-agents such as polyvinyl-, polyallyl compound and polyacrylate improving the cross-linking efficiency of the peroxide used, fillers such as carbon black, kaolin, talcum, calcium carbonate, silica may also be added.

The peroxide most suitable for the purpose, viz. dicumyl peroxide, has the disadvantage that the finished cross-linked products have a disagreeable and undesirable odour. Moreover, cross-linking with the aid of this peroxide within the time desired in practice is only possible at temperature above 160° C. These temperatures, however, can hardly be attained in the usual forms of apparatus. Moreover, at these temperatures degradation of the elastomers to be cross-linked may occur, especially with longer vulcanization times.

According to the present invention a process of preparing a cross-linkable composition comprises compounding a virtually saturated synthetic rubber with sulphur or a sulphur liberating compound and one or more organic peroxides of the formula

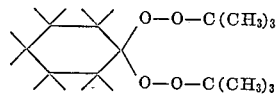

in which some or all of the hydrogen atoms of the cyclohexyl nucleus in the peroxide are substituted by any one or more similar or dissimilar alkyl, cycloalkyl or alkylcycloalkyl radicals having 1–9 carbon atoms in a quantity sufficient for cross-linking.

Also according to the invention a cross-linkable composition comprises a virtually saturated synthetic rubber, sulphur or a sulphur liberating compound and one or more organic peroxides of the formula

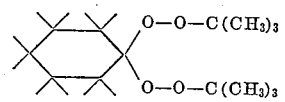

in which some or all of the hydrogen atoms of the cyclohexyl nucleus in the peroxide are substituted by any one or more similar or dissimilar alkyl, cycloalkyl or alkylcycloalkyl radicals having 1–9 carbon atoms in a quantity sufficient for cross-linking.

The sulphur liberating compounds are preferably tetramethyl- and tetraethyl thiuramdisulphide, alkylphenol disulphide, morpholine disulphide. The composition also preferably includes conventional fillers, e.g., carbon black, koalin, talcum, calcium carbonate and silica and may in addition or alternatively include an auxiliary agent suitable for cross-linking, e.g., diphenylguanidine, zinc- or magnesiumoxide, an antioxidant, a polyalkyl or a polyallyl compound or polyacrylate. For safety and to induce a good distribution of the peroxide throughout the rubber a carrier for the peroxide is added to the peroxide before mixing with the rubber. The carrier is preferably calcium carbonate, calcium silicate, magnesium silicate, silicic acid, aerosil, diatomaceous earth or a mixture thereof.

The following peroxides are preferred for use in the composition according to the invention:

1,1-bis(tertiary butylperoxy)-cyclohexane
1,1-bis(tertiary butylperoxy)-2,5-dimethylcyclohexane
1,1-bis(tertiary butylperoxy)-3,4-dimethylcyclohexane
1,1-bis(tertiary butylperoxy)-3,5-dimethylcyclohexane
1,1-bis(tertiary butylperoxy)-2-cyclohexylcyclohexane
1,1-bis(tertiary butylperoxy)-4-tertiary butylcyclohexane
2-cyclohexyl-2-(4,4-ditertiary butylperoxycyclohexyl)-propane
1,1-bis(tertiary butylperoxy)-3,3,5-trimethylcyclohexane.

The latter, 1,1-bis(tertiary butylperoxy)-3,3,5-trimethylcyclohexane, is particularly preferred.

The peroxides to be used may be obtained by reacting the corresponding cycloaliphatic monoketones in the presence of an acid reacting catalyst with tertiary butylhydroperoxide whilst removing from the reaction mixture the water formed during the reaction by azeotropic distillation under reduced pressure.

Preferred elastomers particularly suitable for use in the composition according to the invention are the rubber compounds which contain at the working temperature abstractable hydrogen atoms such as polyethylene, ethylene-propylene rubber, E.P.T.-rubber, ethylene-vinylacetate rubber and silicone rubber.

The compounding of the composition takes place at a temperature of not more than 120° C. on conventional mixing rolls.

According to a further aspect of the invention the composition of the invention may be cross-linked by heating the composition at a temperature from 140° to 165° C. for a time sufficient to effect cross-linking. The cross-linking is effected in conventional apparatus.

At 165° C. with the composition according to the invention cross-linking occurs much more rapidly than with a corresponding composition containing dicumyl peroxide as a cross-linking agent. Moreover, the finished cross-linked products do not possess the disagreeable odour obtained with dicumyl peroxide.

In order that the invention may be readily understood, the following specific examples are set forth. Where reference is made in these examples to compression, this was determined with the aid of a Williams Plastimeter in the way described in S.P.E. Journal 17 (1961) 265–270, on the understanding that instead of a weight of 10 kg. a weight of 5 kg. was used. Where reference is made to parts, parts by weight are meant.

*Example 1*

The following compounds were mixed on a mixing roll at a temperature of 80–90° C.:

(A) 100 parts of an ethylene-propylene copolymer (50% by weight of ethylene), 50 parts of HAF carbon black, 0.32 part of sulphur and a composition of 3.0 parts of 1,1-bis(tertiary butylperoxy)-3,3,5-trimethylcyclohexane and 5.8 parts of calcium silicate as a carrier for the peroxide;

(B) 100 parts of an ethylene-propylene copolymer (50% by weight of ethylene), 50 parts of HAF carbon black, 0.32 part of sulphur and a mixture of 2.7 parts of dicumylperoxide and 4 parts of calcium silicate as a carrier for the peroxide.

The peroxide concentrations in the compositions A and B are equimolar. The compositions A and B were cross-linked for periods of 10, 20, 30 and 40 minutes in a press at a temperature of 165° C. After 30 minutes at a temperature of 120° C. the compression of samples from the sheets thus obtained was determined. The results obtained are given below in tabular form.

| Peroxide | Composition | Compression in percent after cross-linking for the following periods in minutes | | | |
|---|---|---|---|---|---|
| | | 10 | 20 | 30 | 40 |
| 1,1-bis(tert.butylperoxy)-3,3,5-trimethylcyclohexane | A | 12 | 5 | 4 | 4 |
| Dicumyl peroxide | B | 19 | 9 | 5 | 4 |

A composition according to A and B, without peroxide however, showed after a thermal treatment of 40 minutes at 165° C. a compression of 49%.

Example 2

100 parts of an ethylene-propylene copolymer, 50 parts of HAF carbon black, 0.32 part of sulphur and 3.8 parts of 2-cyclohexyl-2-(4,4-ditertiary butylperoxy-cyclohexyl)-propane were compounded in the way as described in Example 1 (composition C).

A composition corresponding to composition C but also containing 5.8 g. of calcium carbonate was prepared by previously mixing the peroxide with the calcium carbonate as a carrier (composition D).

A third composition (composition E) was prepared by substituting the calcium carbonate by the same quantity of calcium silicate in composition D.

The cross-linking and the measurement of the compression were made in the same way as described in Example 1.

| Peroxide | Composition | Compression in percent after cross-linking for the following periods in minutes | | | |
|---|---|---|---|---|---|
| | | 10 | 20 | 30 | 40 |
| 2-cyclohexyl-2-(4,4-ditert.butylperoxy-cyclohexyl)-propane | C | 12 | 5 | 4 | 4 |
| Do | D | 11 | 5 | 4 | 4 |
| Do | E | 12 | 5 | 4 | 4 |
| Dicumyl peroxide | B | 19 | 9 | 5 | 4 |

Example 3

100 parts of ethylene-vinylacetate-copolymer (55% by weight of ethylene), 50 parts of HAF carbon black and 2.40 parts of tetramethylthiuramdisulphide were compounded as described in Example 1 with a mixture of 3.0 parts of 1,1-bis(tertiary butylperoxy)-3,3,5-trimethylcyclohexane and 5.8 parts of calcium silicate (composition F) and a mixture of 2.7 parts of dicumyl peroxide and 4 parts of calcium silicate (composition G). The cross-linking and the measurement of the compression were also executed as described in Example 1.

| Peroxide | Composition | Compression in percent after cross-linking for the following periods in minutes | | | |
|---|---|---|---|---|---|
| | | 10 | 20 | 30 | 40 |
| 1,1-bis(tert.butylperoxy)-3,3,5-trimethylcyclohexane | F | 15 | 7 | 5 | 5 |
| Dicumyl peroxide | G | 21 | 12 | 6 | 5 |

A composition according to F and G, but not containing the peroxide, showed a compression of 52% under the same conditions.

Example 4

100 parts of ethylene-propylene copolymer (50% by weight of ethylene), 50 parts of HAF carbon black, 0.32 part of sulphur were compounded in the way as described in Example 1 with equimolar quantities of various peroxides listed in the table below. The corresponding compositions obtained are indicated. The peroxides were dosed as 40% products on calcium silicate as a carrier. The cross-linking took place at 165° C. or 140° C. for a period of 20 minutes. The compression measurement was effected in the way described in Example 1.

| Peroxide | Percent of pure peroxide | Composition | Cross-linking temp., ° C. | Compression in percent |
|---|---|---|---|---|
| 1,1-bis(tert.butylperoxy)-3,3,5-trimethylcyclohexane | 3.0 | A | 140 | 8 |
| 1,1-bis(tert.butylperoxy)cyclohexane | 2.6 | H | 165 | 8 |
| Do | 2.6 | H | 140 | 10 |
| 1,1-bis(tert.butylperoxy)-2,5-dimethylcyclohexane | 2.9 | I | 140 | 7 |
| Do | 2.9 | I | 165 | 4 |
| 1,1-bis-(tert.butylperoxy)-3,4-dimethylcyclohexane | 2.9 | J | 140 | 8 |
| Do | 2.9 | J | 165 | 5 |
| Dicumyl peroxide | 2.7 | B | 140 | 11 |

Example 5

100 parts of an ethylene-propylene terpolymer, 50 parts of HAF carbon black, 0.32 part of sulphur and a mixture of 3.0 parts of 1,1-bis(tertiary butylperoxy)-3,3,5-trimethylcyclohexane and 5.8 parts of calcium silicate as a carrier for the peroxide were compounded in the way as described in Example 1 (composition K).

A second composition was prepared by substituting 1,1-bis(tertiary butylperoxy)-3,3,5-trimethylcyclohexane by 2.7 parts of dicumyl peroxide (composition L). The cross-linking and the measurement of the compression were made in the same way as described in Example 1.

| Peroxide | Composition | Compression in percent after cross-linking for the following periods in minutes | | | |
|---|---|---|---|---|---|
| | | 10 | 20 | 30 | 40 |
| 1,1-bis(tert.butylperoxy)-3,3,5-trimethylcyclohexane | K | 11 | 4 | 3 | 3 |
| Dicumyl peroxide | L | 18 | 8 | 4 | 3 |

Example 6

The following compounds were compounded on a mixing roll at a temperature of 110° C.: 100 parts of a low density polyethylene, 50 parts of HAF carbon black, 0.32 part of sulphur, 7.5 parts of 1,1-bis(tertiary butylperoxy)-3,3,5-trimethylcyclohexane and 4.6 parts of a filler. The composition was cross-linked for a period of 30 minutes at 150° C. A compression of 4% was found.

A similar composition without peroxide showed after the same heat treatment a compression of 76%.

Example 7

In ethylene-propylene-copolymer the rate of cross-linking with 1,1-bis(tertiary butylperoxy)-3,3,5-trimethylcyclohexane and 2-cyclohexyl-2(4,4-ditertiary butylperoxycyclohexyl)-propane was determined with a Shawbury curometer whereafter this was compared with the rate of cross-linking with dicumyl peroxide. The compositions have already been described in the foregoing examples; the peroxides are equimolarly dosed. The times at which the elastomer reached 90% and 95% of the maximum cross-linking were determined at 150° C.

| Peroxide | Percent of pure peroxide | Composition | Time in minutes required to reach the indicated percentages of maximum cross-linking | |
|---|---|---|---|---|
| | | | 90% | 95% |
| 1,1-bis(tert.butyl-peroxy)-3,3,5-tri-methylcyclohexane | 3.0 | A | 6 | 8 |
| 2-cyclohexyl-2(4,4-ditert.butylperoxy-cyclohexyl)-propane | 3.8 | C | 6 | 7 |
| Do | 3.8 | E | 6 | 7 |
| Dicumyl peroxide | 2.7 | B | 29 | 34 |

The Shawbury curometer referred to in this example has been described in "Rubber and Plastic Weekly" of Mar. 2, 1963.

While specific examples of preferred methods embodying the present invention have been described above, it will be apparent that many changes and modifications may be made in the details of the methods of procedure without departing from the true spirit of the invention. It will therefore be understood that the particular methods set forth above are intended to be illustrative only, and are not intended to limit the scope of the invention which is defined by the following claims:

What is claimed is:

1. A cross-linkable composition consisting essentially of a virtually saturated synthetic rubber, sulphur or a sulphur liberating compound and an organic peroxide of the formula

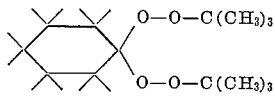

in which some or all of the hydrogen atoms of the cyclohexyl nucleus in the peroxide are substituted by any one or more similar or dissimilar alkyl, cycloalkyl or alkylcycloalkyl radicals having 1-9 carbon atoms, the said peroxide being present in a quantity sufficient for cross-linking.

2. A composition according to claim 1 wherein said rubber is selected from the group consisting of ethylene-propylene copolymer, ethylene-vinylacetate copolymer, polyethylene and ethylene-propylene terpolymer.

3. A composition according to claim 1, wherein said peroxide is selected from the group consisting of 1,1-bis (tertiary butylperoxy)-3,3,5-trimethylcyclohexane, 2-cyclohexyl-2-(4,4-ditert.butylperoxycyclohexyl)-propane, 1,1-bis(tert.butylperoxy)-cyclohexane, 1,1-bis (tert.butylperoxy)-2,5-dimethylcyclohexane and 1,1-bis(tert.butylperoxy)-3,4-dimethylcyclohexane.

4. A composition according to claim 1 wherein said peroxide is blended with a carrier selected from the group consisting of calcium silicate and calcium carbonate.

5. A process for cross-linking an elastomer which comprises compounding a mixture consisting essentially of a virtually saturated synthetic rubber, sulphur or sulphur liberating compound and an organic peroxide of the formula

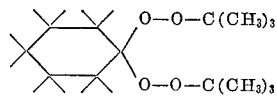

in which some or all of the hydrogen atoms of the cyclohexyl nucleus in the peroxide are substituted by any one or more similar or dissimilar alkyl, cycloalkyl or alkylcycloalkyl radicals having 1-9 carbon atoms in a quantity sufficient for cross-linking at a temperature of not more than 120° C. and heating the resulting composition at a temperature in the range from 140° C. to 165° C. for a time sufficient to effect cross-linking.

6. A process according to claim 5 wherein said peroxide before compounding is blended with a carrier.

7. A process for cross-linking an elastomer, which comprises compounding at a temperature of 80–110° C. a virtually saturated synthetic rubber selected from the group consisting of polyethylene, ethylene-propylene (ter)copolymer and ethylene-vinylacetate copolymer with a compound selected from the group consisting of sulphur and tetramethylthiuram disulphide, carbon black as filler and a peroxide selected from the group consisting of 1,1-bis(tert.butylperoxy)-3,3,5-trimethylcyclohexane, 2-cyclohexyl - 2-(4,4-ditert.butylperoxycyclohexyl)-propane, 1,1-bis(tert.butylperoxy) - cyclohexane, 1,1-bis(tert.butylperoxy)-2,5-dimethylcyclohexane and 1,1-bis(tert.butylperoxy)-3,4-dimethylcyclohexane, and heating the resulting composition at a temperature in the range from 140° C. to 165° C. for a period sufficient to effect cross-linking.

8. A process according to claim 7, wherein prior to compounding the said peroxide is blended with a carrier selected from the group consisting of calcium silicate and calcium carbonate.

No references cited.

JOSEPH L. SCHOFER, *Primary Examiner.*

D. K. DENENBERG, *Assistant Examiner.*